United States Patent
Wnuk et al.

(10) Patent No.: US 8,298,421 B2
(45) Date of Patent: Oct. 30, 2012

(54) FILTER DEVICE

(75) Inventors: Ralf Wnuk, Bexbach (DE); Markus Maretyak, Clausen (DE)

(73) Assignee: Hydac Process Technology GmbH, Neunkirchen (DE)

( * ) Notice: Subject to any disclaimer, the term of this patent is extended or adjusted under 35 U.S.C. 154(b) by 1682 days.

(21) Appl. No.: 10/587,302

(22) PCT Filed: Nov. 23, 2004

(86) PCT No.: PCT/EP2004/013275
§ 371 (c)(1),
(2), (4) Date: Jul. 26, 2006

(87) PCT Pub. No.: WO2005/072845
PCT Pub. Date: Aug. 11, 2005

(65) Prior Publication Data
US 2007/0158261 A1   Jul. 12, 2007

(30) Foreign Application Priority Data
Jan. 30, 2004   (DE) .......................... 10 2004 004 756

(51) Int. Cl.
*B01D 29/00*   (2006.01)
(52) U.S. Cl. ................. 210/333.01; 210/413; 210/333.1
(58) Field of Classification Search ............. 210/333.01, 210/333.1, 413
See application file for complete search history.

(56) References Cited

U.S. PATENT DOCUMENTS
2003/0213127 A1* 11/2003 Wnuk et al. ............... 29/896.62

FOREIGN PATENT DOCUMENTS

| DE | 21 10 864 | 9/1972 |
|----|-----------|--------|
| DE | 34 05 179 | 8/1985 |
| DE | 197 34 588 | 2/1999 |
| DE | 199 56 859 | 6/2001 |
| EP | 0 900 584 | 3/1999 |
| EP | 0900584 A1 * | 3/1999 |
| GB | 918 156 | 2/1963 |
| WO | WO 01/21280 | 3/2001 |

* cited by examiner

*Primary Examiner* — Walter D Griffin
*Assistant Examiner* — Denise R Anderson
(74) *Attorney, Agent, or Firm* — Roylance, Abrams, Berdo & Goodman L.L.P.

(57) ABSTRACT

A filter device for the insertion of filter elements (28) to be positioned in a filter housing (10) having a filter inlet (20) and a filter outlet (22) for the fluid to be filtered. The filter elements (28) are traversed in both directions for filtration or backwashing. Certain filter elements (28) perform the filtration in a filtration position and at least one additional filter element (28) can be backwashed in a backwashing position to clean its active filtration surface. As the individual filter elements (28) are brought into the backwashing position and are then returned to their filtration position in succession by a pivoting device (30), the filter elements are individually displaced into the backwashing position in a temporal sequence, in contrast to prior art, where an arm-type backwashing device is pivoted towards the individual filter elements to carry out the backwashing process.

15 Claims, 2 Drawing Sheets

FILTER DEVICE

FIELD OF THE INVENTION

The present invention relates to a filter device for use of filter elements held in a filter housing with a filter inlet and a filter outlet for the fluid to be filtered. Flow through the filter elements is possible in both directions for filtration or backflushing. Some filter elements performing filtration in the filtration position. At least one other filter element can be backflushed in a backflushing position to clean out its effective filter surface.

BACKGROUND OF THE INVENTION

A generic filter device, a reversible flow filter device in particular, is disclosed in WO 98/42426. In the known reversible flow filter device, some of the filter elements used are made conical, especially in the form of tubular, wedge-wire screen filter elements. As a result of the conical execution, the distance between the individual conical wedge-wire screen filter elements or between them and cylindrical filter elements is increased, with the result that the outflow space in the filter housing is enlarged. Consequently, the offlow resistance in filter operation is reduced. During backflushing the conical filter element is obviously superior to a cylindrical one. First of all, this superiority is because of the relatively larger exit cross section of the conical filter elements compared to cylindrical ones for the same filter surface. Since the exit cross section for the conical filter elements compared to the entry cross section formed by the filter surface, that is to say, the free element area, is however relatively small, depending on the magnitude of the flow resistance of the slotted tube a bottleneck forms in which by large part of the system pressure falling off. Therefore, smaller pressure losses occur. This smaller pressure loss is more favorable in terms of energy during backflushing.

During backflushing, a large part of the volumetric throughput for conical and cylindrical filter elements is achieved basically on the bottom end of the filter. The volumetric flows then decrease very quickly. Since the conical element is essentially backflushed much farther, the velocity gradient is additionally smaller. With the inclusion of the velocity profiles relative to the filter surface as a result of the element conicity, an additional cleaning effect compared to cylindrical elements is then achieved. Due to the essentially constant velocity achieved in the cleaning of the conical filter elements, this flow takes place carefully prolonging the service life of these filter elements.

During backflushing, preferably all filter elements are regenerated in succession in chronological order. During backflushing of individual elements, filtration is continued over the remaining slotted tubes so that filtration operation in the known solution is never interrupted. The overpressure prevailing in the reversible flow filter device during the backflushing phase allows a small partial stream of filtrate to flow through the filter element to be cleaned in the reverse direction. The dirt is detached from the element and carried away. The amount of discharge accompanying backflushing cannot be exactly metered, and is based on empirical values. Generally, backflushing takes longer with large amounts in order to ensure reliable cleaning.

In the known solutions (WO 98/42426, DE 195 42 578 and DE 199 56 859), a hollow arm is pivoted to under one free entry cross section of the filter element to be cleaned and accordingly backflushed to remove the quantity of dirty backflushed fluid and from there the backflushed amount travels via the corresponding connecting pieces out of the filter housing for further treatment. In the known solutions, sealing problems arise with respect to connection of the flushing arm to the respective filter element to be backflushed. Otherwise, the pertinent discharge for the backflushed amount accordingly requires a large amount of installation space. Here, with respect to the number of fluid deflections for the backflushed amount, operating states which are unfavorable in terms of energy occur in the known solutions.

SUMMARY OF THE INVENTION

An object of the present invention is to provide an improved filter device, while maintaining the advantages of the prior art filter devices such that sealing problems in backflushing are for the most part prevented, that backflushing favorable in terms of energy is enabled, and that only little installation space is required on the filter device for backflushing.

This object is basically achieved by a filter device where the individual filter elements are moved in succession from their filtration positions into the backflushing positions and back into the filtration positions by a pivoting device. The filter elements are moved individually in succession in time into the backflushing positions. An arm-like backflushing means is no longer pivoted to the individual filter elements for the backflushing process. Since the pertinent pivoting motion for the filter elements can be easily controlled, possible sealing problems can be better managed. Furthermore, the filter device according to the present invention, relative to the seal configuration and the pivoting drive for the filter elements, requires less installation space within the filter housing. Even when space conditions are tight, these filter devices with a backflush mode can then be implemented. This condition has posed problems in the past. Furthermore, with the present invention improved inflow and outflow behavior for the amounts of fluid to be controlled is achieved, even with respect to the backflushing amounts. In terms of energy, this improved flow benefits the filtration operation of the overall filter device.

In the known reversible flow filter devices for backflushing a drivable flushing arm can be moved in succession to positions under the free inlet cross sections of the filter elements for fluid exit of dirty fluid. In contrast, with the filter device of the present invention, the pivoting device requires a correspondingly designed receiving element for holding the filter elements, enabling the individual filter elements for backflushing to approach the backflushing station by a drive pivotable around a pivoting axis within the filter housing.

By preference, the receiving element has two opposing end parts between which the individual filter elements extend. At least the end part facing the filter inlet is pivotably guided along the interior of the filter housing by a sealing means. In this way, a prompt replacement process for used filter elements is achieved by the end parts of the receiving element, if the filter elements are to be replaced by new elements. The sealing means can be designed to be reliable in terms of its sealing action and can be operated over the long term.

In one preferred embodiment of the filter device of the present invention, the filter elements are configured within the filter housing coaxially to the pivoting axis formed by a rod-like drive part. The drive part detachably connects the two end parts to each other. Preferably, the drive part can be driven by a motor, especially a pneumatic motor, with alternating back and forth motion. This motion can be converted by a freewheeling or free wheel device into a constant drive motion in one driving direction for the drive part of the receiving element. With this configuration, a drive concept for moving the individual filter elements from their filtration positions into the backflushing position and from there again into the filtration positions can be achieved in a very economical and space-saving manner. This drive concept also requires less energy.

In another especially preferred embodiment of the filter device of the present invention, part of the filter housing is designed as a cover. Towards its free ends, it has a cavity with an axial extension corresponding more or less to the overall length of the filter elements. In filtration operation in which flow takes place through the preferably conical wedge-wire screen filter elements from the inside to the outside, in the top part of the filter housing a fluid collection space is formed offering few obstacles to filtration operation, and is extremely favorable in terms of the overall energy balance of the filter device. This favorable energy balance also applies to the case in which from there the corresponding amounts are used for backflushing operation, for which fluid is flowing through the filter element to be backflushed in the reverse sequence from the outside to the inside.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
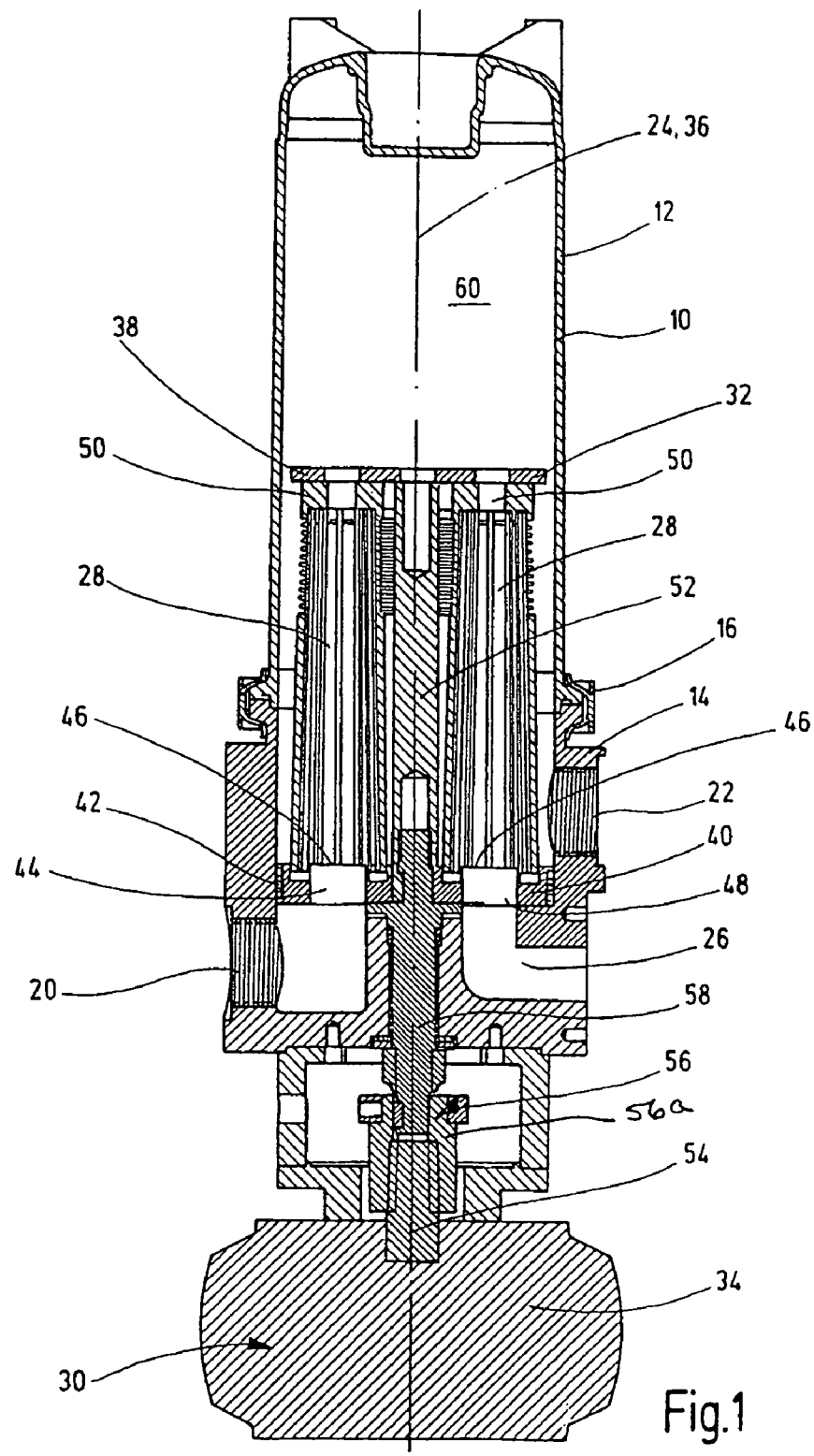
FIG. 1 is a side elevational view in section of a filter device according to an exemplary embodiment of the present invention.
Figure 2:
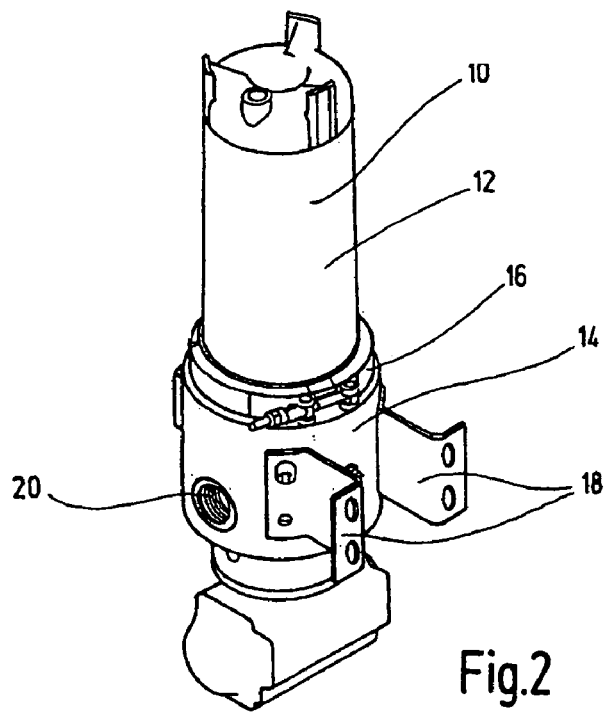
FIG. 2 is a perspective side view of the filter device of FIG. 1.

The filter device shown in FIG. 1, especially a reversible flow filter device, has a cylindrical housing 10 including of a top housing part 12 and a bottom housing part 14. The two housing parts 12, 14 can be detachably connected to each other via a detachable bracket clip 16 (compare FIG. 2). The housing 10 can be attached to other components, for example, those of a hydraulic type, at the bottom housing part 14 by flange-shaped fastening parts 18. The filter housing 10 of the reversible flow filter device has a filter inlet 20 for the fluid to be filtered and a filter outlet 22 for the filtered fluid. Within the bottom housing part 14, diametrically opposite to the filter inlet 20 relative to longitudinal axis 24, a fluid outlet 26 is provided via which a quantity of backflushing liquid can be withdrawn from the device.

Filter elements 28 tapering conically to the top are inserted into the filter device. At least partially cylindrical filter elements (not shown) are able to replace the conical filter elements 28. The conical filter elements 28 of wedge-wire screen filter elements are configured at distances from each other along a cylindrical arc (compare FIG. 3) within the filter housing 10. In an embodiment (not shown), the filter elements 28 can also be configured repeatedly divided into groups along cylindrical arcs. For the embodiment shown in the figures however a total of four filter elements 28 are diametrically opposite each other viewed toward the longitudinal axis 24 of the device. Viewed in the direction of FIG. 3, the top filter element 28 is shown in its backflushing position, and the filter elements 28 located underneath are in their filtration positions.

By a pivoting device 30, the individual filter elements 28 can be moved in succession from their filtration positions into the backflushing position and back into the filtration positions. The rotary motion can take place both clockwise and counterclockwise for the individual filter elements 28.

The pivoting device 30 itself has a receiving element 32 for holding the individual filter elements 28. The receiving element 32 is pivotably mounted within the filter housing 10 for rotation around a pivoting axis 36 by a drive or motor 34. This pivoting axis 36 is essentially congruent with the longitudinal axis 24 of the filter device.

The receiving element 32 has two opposing end parts 38, 40 between which the individual filter elements 28 extend. At least the end part 40 facing the filter inlet 20 is guided along the interior of the filter housing 10 via a sealing means or seal 42. The respective end part 38, 40 is designed as a cylindrical plate. The lower end part 40 on the outer peripheral side has recesses for holding the sealing parts of the sealing means or seal 42. In this way, a sliding seal is attained between the interior of the filter housing 10 and the outer periphery of the lower end part 40.

Figure 3:
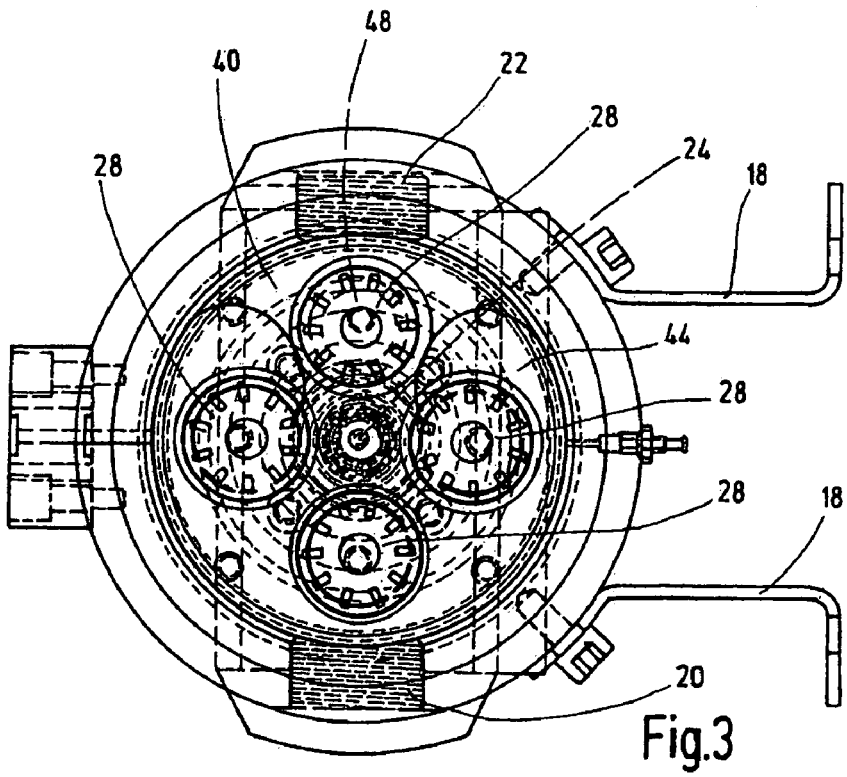
FIG. 3 is a top plan view of the filter device of FIGS. 1 and 2, partially in a section.

As is to be seen especially from FIG. 3, the lower end part 40 has a kidney-shaped recess 44 which can be supplied with fluid from the filter inlet 20. As long as the three filter elements 28 with their lower free opening cross sections 46 as shown in FIG. 3 are located over the kidney-shaped or arcuate recess 44, the fluid to be filtered flows via the filter inlet 20 and the recess 44 as well as the lower opening cross section 46 into the interior of the respective filter element 28. For this purpose, fluid flows through the filter elements 28 from the inside to the outside. Dirt present in the fluid is deposited on the inner wall of the respective hollow filter element. The filter element 28 which is the upper one when viewed in the direction of FIG. 3 is removed therefrom. The filtrate or clean fluid present in the filter housing is routed in the reverse direction, that is, from the outside to the inside, through the upper filter element 28 to be cleaned out since the exterior of each filter element is in fluid communication, as shown. The fluid dirt removed and obtained in this way travels out of the interior of the filter element 28 being backflushed, and in turn flows via its lower free opening cross section 46 in the direction of the fluid outlet 26, and accordingly, out of the device.

For the transport of the backflushing fluid, the lower end part 40 has a circular through opening 48. On the opposing or top end, the individual filter elements 28 are closed, and held in the upper end part 38 having individual recesses 50 engaging or receiving the upper free ends of the filter elements 28. The two end parts 38, 40 are detachably connected to each other along the pivoting axis 26 via a rod-like drive part 52. With the upper cover part 12 removed and the two end parts 38, 40 released from each other, a used filter element 28 can be replaced with a new element in the event this should become necessary. The drive part 52 can be driven by the drive 34 of the filter device designed in particular as a pneumatic motor.

This pneumatic motor has a journal-shaped driven part 54. Depending on the pump motion of the piston parts of the pneumatic motor, as a drive 34 executes alternating back and forth motion, the pertinent back and forth motion then can be converted by a free-wheeling device or free wheel device 56 into a constant drive motion in one driving direction for the drive part 52 of the receiving element 32. The free-wheeling means 56 is especially a free-wheeling sleeve 56a which with its movable components couples the driven part 54 to the drive part 52. For this coupling, the rod-like drive part 52 viewed in the direction of FIG. 1 on its bottom is coupled to a drive axle 58 guided to turn or pivot in the lower housing part 14.

This free-wheeling sleeve 56a of the free-wheeling device 56 is able to relay the alternating back and forth motion of the drive 34 in only one direction to the drive line of the pivoting device 30 including of the driven part 54, the drive axle 58 and the drive part 52. In the other direction, the free-wheeling device 56 does not transmit any torque to the drive line. The free-wheeling sleeve used with an inner star and individually sprung rollers is prior art, and is especially suitable due to its low slip as far as entrainment of the drive axle 58. For the opposite rotary motion for the free-wheeling sleeve, a moment is not delivered to the device or consequently to the drive line. These free-wheeling sleeves and free-wheeling devices 56 are prior art so that they will not be described in detail. The drive axle 58 can also be made in several parts to ensure interchangeability of parts of the axle when wear occurs.

With this drive, alternative back and forth motion of the pneumatic motor as a drive 34 can be converted into pivoting motion by 90° at a time for the filter elements 28 by the pivoting device 30. In this way, in succession one filter element 28 can be cleaned at a time in the backflushing position, while maintaining ordinary filtration operation with the other three filter elements. For a different number of filter elements 2, 3, or 5 and more, then different staggering for the rotary motion by the free-wheeling sleeve is necessary. Based on the kidney-shaped or arcuate configuration of the recess 44 on the bottom end 40, it is moreover ensured for the re-positioning motion that filtration can largely continue always with three filter elements. The backflushing process for the respective filter element 28 can take place in a more or less continuous time intervals. It is also possible to ascertain via difference pressure measurements on the filter elements 28 when they are to be used for backflushing. The pertinent element could then be delivered directly to the backflushing opening 48 with the corresponding control.

From the sectional representation shown in FIG. 1, the upper housing part 12 has a free cavity 60 with an axial extension corresponding more or less to the overall length of the filter elements 28. This configuration has proven especially favorable in terms of energy and the resistance opposing the flow through the filter elements 28 in conventional filtration operation. The resistance of parts of the housing 10 is thus distinctly reduced. Within the cavity 60, essentially laminar flow behavior occurs. This helps flow reduce the outflow resistance in conventional filtration operation.

The tubular wedge-wire screen filter elements preferably used have support rods tilted in the direction of the longitudinal axis 24 of the device and around which a wire section is wound into individual turns, with gaps through which fluid can pass being left open. In the area of each contact point of the wire profile with the support rod, a weld spot is located. The gap size provided for the free fluid passage, that is, the distance between two gaps, prevents passage of dirt if the particle size exceeds the gap width. Dirt trapped in the gaps can then be removed from the filter device by the backflushing operation. The filter element 28 cleaned out in this way then moves from the backflushing position back into the filtration positions and can be used there for further filtration use.

While one embodiment has been chosen to illustrate the invention, it will be understood by those skilled in the art that various changes and modifications can be made therein without departing from the scope of the invention as defined in the appended claims.

What is claimed is:

1. A filter device, comprising:
a filter housing having an unfiltered fluid inlet, a filtered fluid outlet and a backwash fluid outlet;
filter elements in said housing receiving fluid flow in one direction for filtration and in an opposite direction for backwashing effective filter surfaces thereof;
a pivoting device mounting said filter, elements in said filter housing for sequential rotational movement about a pivot axis between filtration positions in which unfiltered fluid flows from inside to outside through said filter elements and a backwashing position in which filtered fluid flows from outside to inside through said filter elements, said pivot device having a rotatably mounted receiving part mounting said filter elements parallel to said pivot axis along a path coaxial to said pivot axis and having first and second end parts, said filter elements extending between said end parts, said first end part facing toward said fluid inlet and rotatably guided along an inside of said filter housing by a seal; and
a drive being coupled to said receiving part to rotate said receiving part, including a rod-shaped drive part releasably connecting said first and second end parts and including a pneumatic motor producing alternating to and fro movements on an output part convertible into a constant drive movement in a drive direction of said drive part by a free wheel device.

2. A filter device according to claim 1 wherein
said free wheel device comprises a free wheel sleeve delivering drive power of said drive to said drive part in one direction up to a set torque and not applying drive torque to said drive part in an opposite direction.

3. A filter device according to claim 1 wherein
said filter elements are conical and are arranged in pairs opposite one another in each pair relative to said pivot axis, each of said filter elements having an inlet opening facing toward said drive.

4. A filter device according to claim 1 wherein
said filtered fluid outlet is disposed in a first housing part of said filter housing facing toward said drive; and
said filter housing including a second housing part being removable from said first housing part, said second housing part having a cavity above said filter elements toward a free end thereof with an axial extension corresponding approximately to an overall length of each said filter element.

5. A filter device according to claim 1 wherein
said fluid inlet and said backwash fluid outlet are located in a part of said filter housing extending between said filtered fluid outlet and said drive.

6. A filter device according to claim 5 wherein
each said filter element comprises a bar screen tube filter element.

7. A filter device according to claim 1 wherein
a lower part of said filter housing comprises an arcuate-shaped recess over which several of said filter elements can be located simultaneously in filtration positions thereof with lower free open cross sections in fluid communication therewith, said arcuate-shaped recess being in fluid communication with said fluid inlet; and
said lower part of said filter housing also comprises a backwash recess over which said filter elements are sequentially located in said backwashing position with said free open cross sections in fluid communication therewith, said backwash recess being in fluid communication with said backwash fluid outlet.

8. A filter device according to claim 7 wherein exterior surfaces of said filter elements are in fluid communication with one another allowing filtered fluid from said filter elements in said filtration positions to flow to and through said filter element in said backwashing position as backwashing fluid.

9. A filter device, comprising:
a filter housing having an unfiltered fluid inlet, a filtered fluid outlet and a backwash fluid outlet;
filter elements in said housing receiving fluid flow in one direction for filtration and in an opposite direction for backwashing effective filter surfaces thereof;
a pivoting device mounting said filter elements in said filter housing for sequential rotational movement about a pivot axis between filtration positions in which unfiltered fluid flows from inside to outside through said filter elements and a backwashing position in which filtered fluid flows from outside to inside through said filter elements, said pivot device having a rotatably mounted receiving part mounting said filter elements parallel to said pivot axis along a path coaxial to said pivot axis and having first and second end parts, said filter elements extending between said end parts, said first end part facing toward said fluid inlet and rotatably guided along an inside of said filter housing by a seal;
a drive being coupled to said receiving part to rotate said receiving part; and
a lower part of said filter housing having an arcuate-shaped recess over which several of said filter elements can be located simultaneously in filtration positions thereof with lower free open cross sections in fluid communication therewith and having a backwash recess over which said filter elements are sequentially located in said backwashing position with said free open cross sections in fluid communication therewith, said arcuate-shaped recess being in fluid communication with said fluid inlet, said backwash recess being in fluid communication with said backwash fluid outlet.

10. A filter device according to claim 9 wherein
said free wheel device comprises a free wheel sleeve delivering drive power of said drive to said drive part in one direction up to a set torque and not applying drive torque to said drive part in an opposite direction.

11. A filter device according to claim 9 wherein
said filter elements are conical and are arranged in pairs opposite one another in each pair relative to said pivot axis, each of said filter elements having an inlet opening facing toward said drive.

12. A filter device according to claim 9 wherein
said filtered fluid outlet is disposed in a first housing part of said filter housing facing toward said drive; and
said filter housing including a second housing part being removable from said first housing part, said second housing part having a cavity above said filter elements toward a free end thereof with an axial extension corresponding approximately to an overall length of each said filter element.

13. A filter device according to claim 9 wherein
said fluid inlet and said backwash fluid outlet are located in a part of said filter housing extending between said filtered outlet and said drive.

14. A filter device according to claim 12 wherein
each said filter element comprises a bar screen tube filter element.

15. A filter device according to claim 9 wherein
exterior surfaces of said filter elements are in fluid communication with one another allowing filtered fluid from said filter elements in said filtration positions to flow to and through said filter element in said backwashing position as backwashing fluid.

* * * * *